INVENTOR.
CHARLES H. BAKER
BY
Oberlin, Maky & Donnelly
ATTORNEYS

United States Patent Office 3,138,918
Patented June 30, 1964

3,138,918
FLUID ENGINE HAVING A PRESSURIZED CRANKCASE
Charles H. Baker, Cleveland, Ohio, assignor to Cleveland Pneumatic Industries, Inc., Cleveland, Ohio, a corporation of Ohio
Filed Apr. 30, 1962, Ser. No. 191,075
8 Claims. (Cl. 60—24)

This invention relates in general to engines and more particularly to fluid engines wherein the work of compression of and the addition of heat to the fluid during the operating cycle of the engine is transmitted through a piston and cylinder assembly to produce movement of a member operatively connected to the piston. The term fluid as used herein is to be interpreted in its broadest sense and is meant to comprehend fluid in the liquid state, fluid in the vapor state, and fluid which fluctuates between the liquid and vapor states during the operational cycle.

It is a principal object of the invention to provide a fluid engine wherein the working fluid assists movement of the piston during its return stroke, thereby to simplify and render the operation more efficient, for example, by lessening the demand for applying a portion of the mechanical energy to such purpose by flywheel means and the like.

Another object of the invention is to provide such a fluid engine wherein the bearing loads on the engine are significantly reduced to further enhance the mechanical efficiency of the engine.

A more specific object is to provide a fluid engine wherein there is particular controlled communication between the interior of the crankcase and the pressurized working fluid afforded by a system requiring no more thant two fluid chambers in the assembly.

Another object of the invention is to provide an improved connection between the crankshaft and the piston rod for transmitting reciprocal movement of said piston rod to rotary movement of said crankshaft.

Yet another object of the invention is to provide a fluid engine capable of providing large amounts of power with relatively small and highly simplified structural components.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In an engine according to the invention, a cycle is utilized in which heated, compressed fluid is expanded against a working surface to produce mechanical power. More particularly, the fluid is first compressed, heated while compressed, and then expanded against the working surface to reduced pressure, with the fluid being thereafter cooled to its initial condition. The illustrated embodiment of the new engine has a sealed crankcase and fluid under pressure is supplied thereto in such manner as to assist the return stroke of the piston thereby to reduce the mass inertia required of the crankshaft and elements operatively connected thereto in return of the piston.

Figure 1:
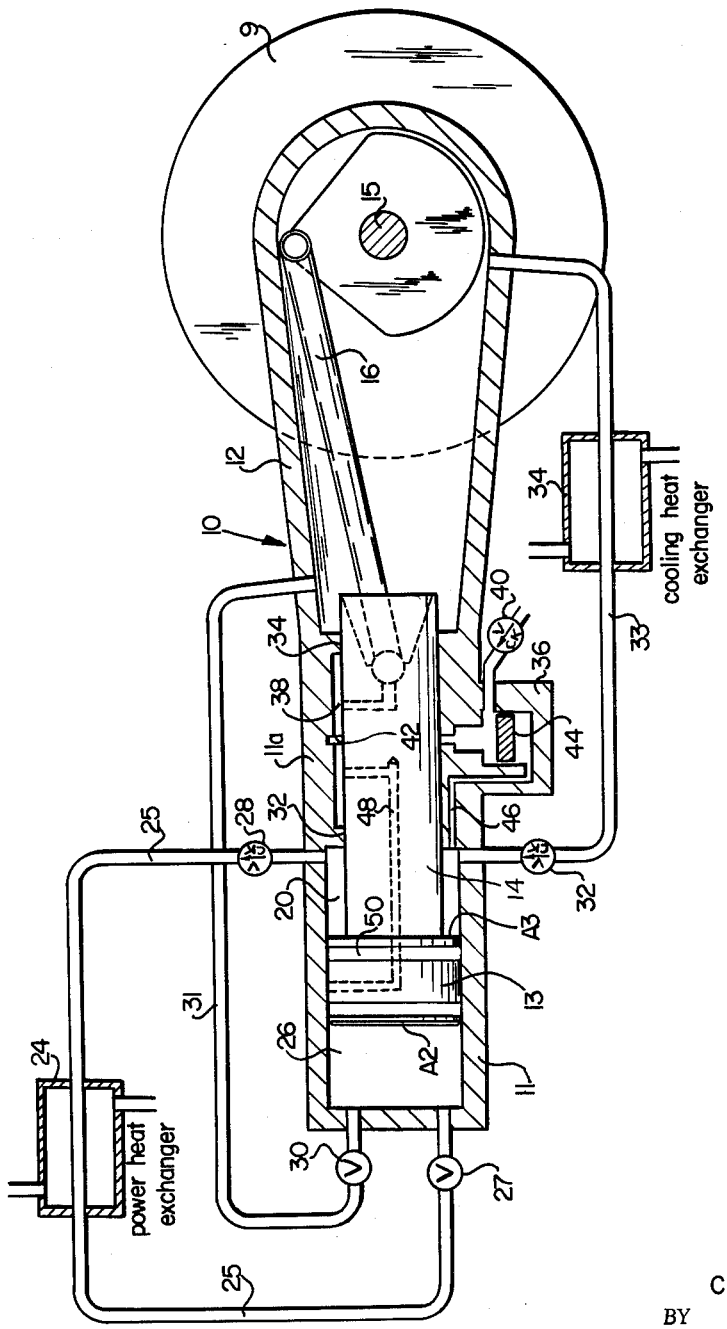
FIG. 1 is a side elevational view, partially in section and partially schematic, of the fluid engine in accordance with the invention.

Referring now to the drawings, wherein like reference characters are used to designate like parts, and particularly to FIG. 1, which is partially schematic, the fluid engine is generally designated at 10 and comprises a cylinder 11, a cylinder extension 11a, and a crankcase 12 extending from the extension 11a. Reciprocably disposed in cylinder 11 is a piston 13 at one end of a piston rod 14 which extends in the direction of the crankcase 12. A suitably journalled shaft 15 is enclosed by the crankcase 12 and has a crank arm to which a connecting rod 16 is pivotally connected. Such connecting rod is pivotally connected at its other end to the piston rod 14, such connection in the form shown being a ball joint connection. To accommodate the movement of connecting rod 16, the end of the piston rod 14 is provided with an outwardly enlarged opening as can be seen in FIG. 1. A flywheel 9 is secured to the crankshaft 15 exteriorly of the crankcase 12.

The piston defines two chambers 26 and 20 within the cylinder 11 at the respective sides of the piston and a liquid seal is provided to isolate this working portion of the cylinder comprising said chambers from direct communication with the crankcase 12. Such seal includes axially spaced annular bearing surfaces 32 and 34 which guidingly support but not unduly resist reciprocable movement of the piston rod 14 in the extension 11a of the cylinder. A cylinder 36 is secured to the cylinder extension 11a and is provided to maintain a suitable lubricating fluid in the liquid seal at a pressure approximately equal to that existing in the adjacent chamber 20. A piston 44 is adapted to reciprocate in the cylinder under conditions to be described hereinbelow.

The liquid seal further comprises a longitudinally enlarged chamber 38 which is adapted to contain a lubricating fluid which is admitted thereto under pressure through check valve 40. An annular groove 42 is adapted to communicate with the chamber 38 to facilitate the flow of lubricating fluid thereto. Piston 44 functions as a pressure transmitting member between the pressure of the working fluid in chamber 20 and the lubricating fluid in chamber 38. A groove 46 is provided in the cylinder walls and communicates at one end thereof with the cylinder 36 below the piston 44, the other end thereof communicating with chamber 20 whereby the pressurized working fluid flows from chamber 20 through said groove into contact with the bottom of piston 44.

The piston rod and piston are provided with an opening 48 which extends from the periphery of the piston 13 to the periphery of the piston rod 14 as clearly shown in FIG. 1, whereby communication with the lubricating chamber is provided, the lubricating oil thus flowing therefrom to the periphery of the piston. A plurality of openings are preferably provided in the piston 13 to lubricate the entire periphery of the piston. Suitable rings such as, e.g., piston rings 50, are employed in a conventional manner.

The cylinder 11 is schematically shown in FIG. 1 as being provided with a plurality of openings in the walls thereof, each of said openings have fluid conduits mounted therein, said conduits having regulating valves positioned therein for the purpose of regulating fluid flow therethrough. It should be kept in mind that FIG. 1 is merely a schematic view and in the actual engine construction the flow regulating valves are preferably, where possible, mounted within the cylinder walls.

Conduits 25 and 31 communicate with chamber 26 through the end wall of cylinder 11, valves 27 and 30 being interposed in lines 25 and 31, respectively, to regulate the flow of fluid to and from chamber 26. Valves 27 and 30 are suitably operatively connected to the crankshaft 15 to be opened and closed at proper related points in the cycle in a well-known manner which forms no part of the present invention. The opposite end of conduit 25 communicates with chamber 20. A check valve 28 is provided relatively adjacent this end for regulating the direction of fluid flow therethrough.

Cylinder 11 is further provided with a conduit 33 which communicates with chamber 20 at one end and with crankcase chamber 12 at its other end, conduit 33 being provided with a check valve 32 interposed therein for the purpose of allowing fluid flow from line 33 into chamber 20 under conditions to be described in more detail hereinbelow.

An appropriate power heat exchanger 24 is interposed in line 25 and is adapted to raise the temperature of fluid flowing therethrough. In conventional manner, the heat exchanger 24 is provided with an inlet and an outlet for the purpose of conveying a suitable heating media through said heat exchanger for heat exchange with the fluid flowing through line 25 within the heat exchanger.

A cooling heat exchanger 34 is interposed in line 33 and is adapted to cool the fluid flowing therethrough. The cooling heat exchanger, similarly to power heat exchanger 24, is shown in FIG. 1 in diagrammatic form, the specific structure thereof forming no part of the instant invention. The cooling heat exchanger 34 is conventionally provided with inlet and outlet ports which provide for flow of cooling fluid therethrough.

As shown in FIG. 1, conduit 31 communicates with the interior of the crankcase chamber 12 through an opening in the crankcase wall. Thus, when valve 30 is opened in timed sequence by revolution of the crankshaft 15, fluid is adapted to flow from chamber 26 to the interior of the crankcase chamber 12, which is at a relatively lower pressure. Similarly, when valve 27 is opened in timed sequence by the crankshaft rotation, fluid flows from chamber 20 through check valve 28, conduit 25 and heat exchanger 24 into chamber 26.

The operational cycle of the fluid engine of my invention will now be described. At the beginning of the power stroke, valve 27 is opened, fluid at high temperature and pressure flowing therethrough from line 25 into chamber 26 and acting against the working face of piston 13. As pisotn 13 travels to the right as viewed in FIG. 1 under the pressure of the working fluid, the fluid in chamber 20 becomes compressed. In this regard it should be noted that the engine is a closed system and conduit 25 is filled with working fluid at all times. As the fluid in chamber 20 is compressed by the piston 13 it will reach a predetermined elevated pressure sufficient to open the check valve 28 thereby enabling the pressurized fluid to flow therethrough into line 25. In the engine in the form shown the pressure in chamber 20 is in excess of 22,000 p.s.i. when the check valve 28 opens. It should be noted that through a proper selection of the working fluid, the fluid within chamber 20 can be adiabatically compressed to the stated pressure with only a relative slight temperature change. For example, assuming the temperature of the fluid in chamber 20 is 70° F. before compression, the temperature rise accompanying the increase in pressure will generally be in the range of 40–50°. The fluid preferably used in the engine in the form shown is Freon although it will be apparent that any suitable fluid could be employed.

Subsequent to the compression of the working fluid in the chamber 20 to the desired pressure, the fluid flows through the power heat exchanger 24 where the fluid takes on heat but remains at essentially a constant pressure. As the working fluid leaves the power heat exchanger 24 it is at an elevated pressure in excess of 22,000 p.s.i. and at a temperature in the general range of 400 to 500° F. As the fluid enters chamber 26 and acts against the working surface of the piston 13 thereby performing work, the fluid expands thereby decreasing in pressure. Although the pressure in chamber 20 equals or exceeds the pressure in chamber 26 during a certain portion of the power stroke, the significantly greater area of the working surface of the piston 13 in the chamber 26 in comparison to the area of the piston 13 in chamber 20 enables the force therein to move the piston to the right, as will be readily apparent.

During normal operation of the fluid engine, the valve 27 does not remain open during the entire power stroke, the power stroke, of course, occupying 180° of the crankshaft rotation. Rather, the valve 27 is closed or cut off at approximately 120° rotation of the crankshaft subsequent to the opening of the valve 27. Thus, near the end of the power stroke, the working fluid expands thereby resulting in a reduction of pressure. As will be apparent, the expansion of the working fluid is accompanied by a reduction in temperature thereof.

During the power stroke of piston 13 a minor portion of the compressed fluid in chamber 20 is forced through passage 46 into cylinder 36, contacting the bottom of piston 44. The fluid will pass through passage 46 only to the extent necessary to raise the piston 44 sufficiently to compress the lubricating fluid in the chamber 38 to an extent wherein such pressure is equal or substantially equal to the pressure of the fluid in chamber 20. Due to the attained equal pressures in chambers 20 and 38, there is no tendency of the working fluid to flow past the annular bearing surface 32 into the liquid seal.

As the piston 13 reaches its bottom dead center position, the valve 30, which, as set forth above, is operatively connected to the crankshaft 15 is opened, thereby allowing fluid flow through line 31 to the interior of the crankcase 12, the latter being at a relatively lower pressure. The fluid flow into the crankcase chamber 12 significantly raises the pressure therein and, more specifically, the pressure on the forward end of the piston rod 14. As will be made more apparent hereinbelow this pressure on the forward end of rod 14 assists the piston 13 in its return stroke.

When the piston is in its bottom dead center position, the return stroke thereof is initiated by the inertia of the crankshaft 15 and the flywheel 9. As this inertia moves the piston 13 on its return stroke, chamber 20 will expand and become an area of relatively low pressure. When the pressure in chamber 20 becomes less than the pressure of the fluid in the crankcase chamber, the fluid will flow from the latter to the former through conduit 33. The fluid flowing through conduit 33 to chamber 20 passes through cooling heat exchanger 34 whereby the temperature of said fluid is reduced. The heat exchanger 34, and particularly the cooling fluid emplyed therein, is selected to cool the working fluid flowing therethrough to the extent necessary to achieve optimum efficiency in the engine. The working fluid in chamber 20 will thus be at relatively low pressure and temperature. As the piston 13 completes its return stroke and reaches its top dead center position, fluid from the crankcase 12 will have filled chamber 20, the latter of course achieving its greatest volume when the piston 13 is in its top dead center position.

As will be apparent, the return of the working fluid from the crankcase 12 to the chamber 20 causes said fluid to act on that face of the piston 13 adjacent the piston rod 14. As will also be apparent, such force will be equal to the pressure of the working fluid times the area of such piston face. This force also assists the piston 13 in its return stroke.

Due to the pressurizing of the crankcase and the significant assistance which such pressurized fluid provides in returning the piston 13 in its return stroke, substantial reductions in size and weight can be made for those components which must store energy in the form of inertia for returning the piston in its return stroke. Specifically, the connecting rod, crankshaft and flywheel can be significantly reduced in size and still function to provide sufficient inertia. A reduction in the size of the crankshaft and flywheel enables a greater percentage of the power achieved during the power stroke to be effectively used, thereby increasing the efficiency of the engine. Further, a reduction in size of the connecting rod reduces the bearing load at the connection between the connecting rod and the piston rod.

Figure 2:
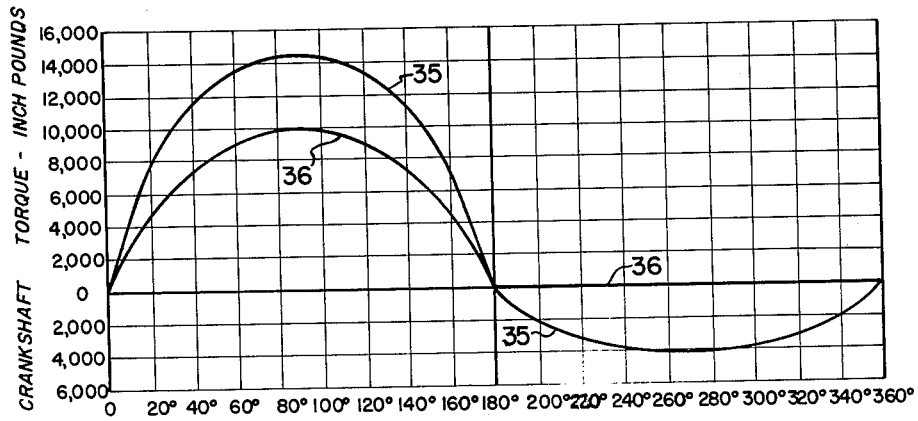
FIG. 2 is a graph comparing the crankshaft torque of an engine having a crankcase at atmosphere pressure with the crankshaft torque of the fluid engine of the invention wherein the crankcase is pressurized.
Figure 3:
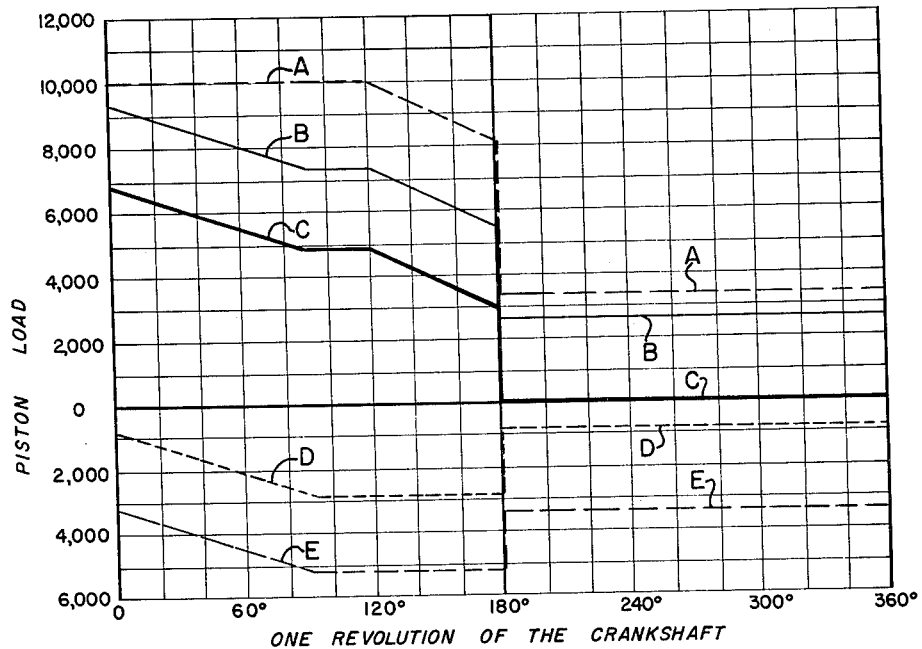
FIG. 3 is a graph comparing the loading on the piston of an engine having a crankcase open to the atmosphere with the piston loading in the pressurized crankcase of the new fluid engine.

Referring to FIG. 2, there is shown therein a graph comparing the crankshaft torque, represented in inch pounds, of an engine wherein the crankcase is open to atmospheric pressure with an engine wherein the crankcase is pressurized, the engines being otherwise identical. The abscissa represents one revolution of the crankshaft and is divided into degrees, such revolution starting at the beginning of the power stroke, and the ordinate represents the crankshaft torque in inch pounds. The line 35 depicts the crankshaft torque where the crankcase is at atmospheric pressure, and the line 36 represents a pressurized crankcase. It will be understood that the figures used in both FIGS. 2 and 3 are for illustrative comparative purposes only and that such figures will of course vary with the size of the engines employed. It will be noted from line 35 that on the return stroke of the piston 13 in an engine having a crankcase at atmospheric pressure, the return stroke being represented in FIG. 2 between 180° and 360°, there is a substantial resistance to the rotation of the crankshaft. This resistance results from the fact that the return stroke of the piston 13, when the crankcase is not pressurized, meets with resistance or force equal to the pressure of the working fluid in chamber 26 times the area of the working surface of the piston. Stated somewhat differently, the working fluid in chamber 26 cannot be expelled quickly enough through line 31 to preclude the presence of resistive force therein to the return stroke of the piston. The only means to overcome this resistance in an engine having a crankcase at atmospheric pressure is to employ engine components which store sufficient energy to provide sufficient inertia.

This should be contrasted to the crankshaft torque in a fluid engine wherein the crankcase is pressurized, such engine being illustrated by line 36. While torque during the power stroke of such an engine is somewhat lower, there is no opposing crankshaft torque during the return stroke. The reason for this zero torque during the return stroke is that through the use of the pressurized crankcase, the working fluid assists the return stroke of the piston 13 in the manner described above. It will be further noted that the net area bounded by the curves 35 and 36 during the crankshaft revolution are substantially equal. Specifically, the area under curve 36, bounded by the line of zero torque, is substantially equal to the area under curve 35, bounded by the line of zero torque, during the power stroke minus the opposing torque, above curve 35, during the return stroke. It should also be apparent that although the torque is greater during the power stroke of an engine having a crankcase at atmospheric pressure, a substantial portion of this torque is dissipated in the form of stored energy in the crankshaft and flywheel in order to provide sufficient inertia for the return stroke. The achieving of a zero crankshaft torque on the return stroke of the piston enables the employment of a crankshaft, a flywheel, and a connecting rod of reduced size thereby increasing the efficiency of the engine.

The marked advantage of the new fluid engine is depicted in yet another way in FIG. 3. There is compared therein in graphic form the resultant piston loads of an engine employing a crankcase open to atmospheric pressure with a fluid engine wherein the crankcase is pressurized. The abscissa in FIG. 3 represents one revolution of the crankshaft and is scaled in degrees, such revolution initiating at the beginning of the power stroke. The ordinate represents the piston load in pounds during various portions of crankshaft revolution.

The dotted line A in FIG. 3 represents the power load on the piston 13 in both engines and is equal to the pressure of the fluid in pounds per square inch times the area of the working surface of the piston, such working surface being shown at A2 in FIG. 1. Line A is substantially constant for 120° at which time it inclines downwardly to 180°. As set forth above, the valve 27 is preferably open for approximately 120° rotation of the crankshaft 15 at which time it closes thereby allowing a predetermined mass of fluid to enter chamber 26. Since the volume of chamber 26 at the completion of the power stroke is substantially greater for this same unit mass of working fluid admitted during the first portion of the power stroke, there is a decrease in the load on the piston as shown by the inclined portion of line A from 120° to 180°. This line then drops vertically at 180°, at which time the piston 13 is in its bottom dead center position, and then levels off during the return stroke of the piston. This piston load during the return stroke represents the resistance of the working fluid in chamber 26 to the return stroke of the piston.

The line B represents the resultant load on the piston wherein the crankcase is under atmospheric pressure throughout, the resultant load being equal to the power load represented by line A minus the compression load during the crankcase revolution, represented by line D, to be further described below. The terms power and compression loads used herein for purposes of illustration are meant to include the pressures acting on the piston during the complete crankshaft revolution and not just during the power stroke.

Line C is the resultant load wherein the crankcase is pressurized, and, similarly, equals the load as depicted in line A of FIG. 3 minus the compression load during the crankcase revolution, represented by line E.

It will be noted that in a crankcase open to the atmosphere the resistive force during the power stroke, such force being represented by line D, is less than the resistive force to the power stroke wherein the crankcase is pressurized, which is represented by line E. The resultant load wherein the crankcase is at atmospheric pressure as represented by line B is thus somewhat higher than the resultant load as represented by line C.

In engines employing a crankcase open to atmospheric pressure, the force assisting the return of the piston, excepting the inertia force, is relatively small, as illustrated in line D in the area between 180° and 360°. The resultant load on the piston wherein the crankcase is open to atmosphere is thus diminished only slightly, the resultant load, represented by line B, being in the neighborhood of 2,500 pounds during the return stroke of the piston, corresponding to the latter half of the revolution of the crankshaft. This resultant load, which, as will be apparent, resists the return movement of the piston, must be compensated for by employing a crankshaft and a flywheel of sufficient size and weight to provide sufficient inertia to overcome such load.

This should be contrasted with the resultant load wherein the crankcase is pressurized, as represented by line C. It will be seen that the resultant load during the return stroke of the piston is zero, the resistive force offered in chamber 26 during such return stroke being offset by the force of the working fluid acting on the piston in a direction toward top dead center. As set forth above, this force comprises, in addition to inertia, the force of the fluid acting on the end of the piston rod 14 and the fluid entering chamber 20 through valve 32 and acting on the area A3. This substantially reduced resultant load during the power stroke and zero resultant load during the return stroke is a direct result of pressurizing the crankcase. Through such pressurization reductions in size can be made in the crankshaft and the flywheel, as well as improving the connections between the connecting rod and the piston rod. These structural changes resulting from pressurization of the crankshaft result in a fluid engine having a marked increase in efficiency.

Other modes of applying the principle of the invention may be employed, change being made as regards the details described, provided the features stated in any of the following claims or the equivalent of such be employed.

I, therefore, particularly point out and distinctly claim as my invention:

1. A fluid engine comprising cylinder meanns and piston means reciprocably mounted therein, said cylinder being constructed and arranged to provide relatively adjacent one end thereof fluid receiving chambers of varying volume on either side of said piston, a chamber for housing a rotatable output member, connecting means interposed between said piston means and said rotatable output member for translating reciprocating movement of said piston into rotary movement of said output member, and means for establishing communication between said chambers adjacent said piston and said chamber housing said rotatable output member whereby fluid conveyed to said latter chamber assists the piston during its return stroke.

2. A fluid engine comprising a cylinder and piston means reciprocable therein adjacent one end thereof, said cylinder being constructed and arranged to provide chambers on either side of said piston, said piston chambers varying in volume as said piston reciprocates in said cylinder, a chamber for housing a rotary crankshaft, said piston chambers being sealed from said crankshaft chamber interiorly of said cylinder, fluid conveying means exteriorly of said cylinder and communicating with openings in the walls of said cylinder, said fluid conveying means establishing communication between said piston chambers and said crankshaft chamber whereby fluid conveyed to said crankshaft chamber from one of said piston chambers assists said piston during the return stroke thereof.

3. A fluid engine comprising cylinder means and piston means reciprocably mounted therein, said cylinder being constructed and arranged to provide relatively adjacent one end thereof fluid receiving compression and expansion chambers of varying volume on either side of said piston, a chamber housing a rotatable output member, connecting means interposed between said piston means and said rotatable output member for translating reciprocating movement of said piston into rotary movement of said output member, and means for establishing communication between said expansion chamber and said chamber housing said rotatable output member, and between said output member chamber and said compression chamber whereby the fluid conveyed from said output member chamber to said compression chamber exerts a force on said piston during its return stroke.

4. A fluid engine comprising cylinder means and piston and piston rod reciprocably mounted therein, said cylinder being constructed and arranged to provide relatively adjacent one end thereof fluid receiving compression and expansion chambers of varying volume on either side of said piston, a chamber housing a rotatable crankshaft, connecting means interposed between said piston and said crankshaft for translating reciprocating movement of said piston into rotary movement of said crankshaft, first fluid conduit means establishing communication between said expansion chamber and said crankshaft chamber, second conduit means establishing communication between said compression chamber and said crankcase chamber, whereby the fluid conveyed to said crankshaft chamber by said first conduit means exerts a force on the end of said piston rod and is returned to said compression chamber by said second conduit means to exert a force on said piston during its return stroke.

5. The combination of claim 4 wherein said connecting means interposed between said piston means and said crankshaft comprises a connecting rod operatively secured at one end thereof to said crankshaft, said connecting rod being secured at its other end to said piston rod through a ball joint connection.

6. The combination of claim 4 further including a third conduit means interconnecting said compression and said expansion chambers, and valve means interposed in said third conduit means to control the fluid flow from said compression chamber to said expansion chamber.

7. The combination of claim 6 further including heating means in heat exchange relation with said third conduit means to heat the fluid flowing therethrough, and cooling means interposed in said second conduit means to cool the fluid flowing from said crankshaft chamber to said compression chamber.

8. In the operation of a fluid engine having a piston and cylinder assembly, an output shaft, and means connecting the piston and shaft for rotation of the latter by reciprocation of the piston; the steps comprising introducing a pressurized fluid into said cylinder to act on one end of said piston, the piston being moved by said fluid during the power stroke thereby performing work in the form of rotation of said output shaft, conveying said fluid at an elevated pressure at the end of said power stroke to a chamber housing said rotary output shaft, and applying said fluid thus supplied to said chamber to assist the returning stroke of the piston.

References Cited in the file of this patent

UNITED STATES PATENTS

| | | |
|---|---|---|
| 324,060 | Woodbury et al. | Aug. 11, 1885 |
| 459,501 | Ventzki | Sept. 15, 1891 |
| 1,879,563 | Smith | Sept. 27, 1932 |
| 1,895,082 | Montero | Jan. 24, 1933 |
| 2,067,453 | Lee | Jan. 12, 1937 |